March 17, 1970  G. J. EASTON ET AL  3,500,765

GAS-CUSHION VEHICLES

Filed Sept. 12, 1967  5 Sheets-Sheet 1

INVENTORS
G. J. EASTON
D. S. BLISS
BY
Cameron, Kerkam & Sutton
ATTORNEYS

March 17, 1970     G. J. EASTON ET AL     3,500,765
GAS-CUSHION VEHICLES
Filed Sept. 12, 1967     5 Sheets-Sheet 2

INVENTORS
G. J. EASTON
D. S. BLISS
BY
Cameron, Kerkam & Sutton
ATTORNEYS

March 17, 1970  G. J. EASTON ET AL  3,500,765
GAS-CUSHION VEHICLES
Filed Sept. 12, 1967  5 Sheets-Sheet 3

INVENTORS
G. J. EASTON
D. S. BLISS
BY
Cameron, Kerkam & Sutton
ATTORNEYS

INVENTORS
G. J. EASTON
D. S. BLISS
BY
Cameron, Kerkam & Sutton
ATTORNEYS

March 17, 1970 G. J. EASTON ET AL 3,500,765
GAS-CUSHION VEHICLES
Filed Sept. 12, 1967 5 Sheets-Sheet 5

INVENTORS
G. J. EASTON
D. S. BLISS
BY
Cameron, Kerkam & Sutton
ATTORNEYS 3,500,765
GAS-CUSHION VEHICLES
Geoffrey John Easton, Christchurch, and Denys Stanley Bliss, Southampton, England, assignors to Hovercraft Development Limited, London, England, a British company
Filed Sept. 12, 1967, Ser. No. 667,149
Claims priority, application Great Britain, Sept. 13, 1966, 40,963/66
Int. Cl. B61b *13/08;* B60v *3/04*
U.S. Cl. 104—23               11 Claims

ABSTRACT OF THE DISCLOSURE

An air-cushion train which in operation is supported and guided by a concrete track of rectangular cross-section. The vehicle is supported by air-cushions formed between the vehicle and the top surface of the track and is guided by air-cushions between the side faces of the track and track-straddling structural parts of the vehicle body. Actuating means are provided for lifting these side parts away from the track so that the vehicle is free to leave one branch of the track and follow another.

The actuating means operate automatically, being responsive to signals generated outside the vehicle body.

This invention relates to gas-cushion vehicles operable over prepared tracks, that is to say, to vehicles which in operation are supported above a prepared track, at least in part, by a cushion of pressurized gas (usually air) formed and contained between the vehicle body and an upper surface of said track.

Figure 1:
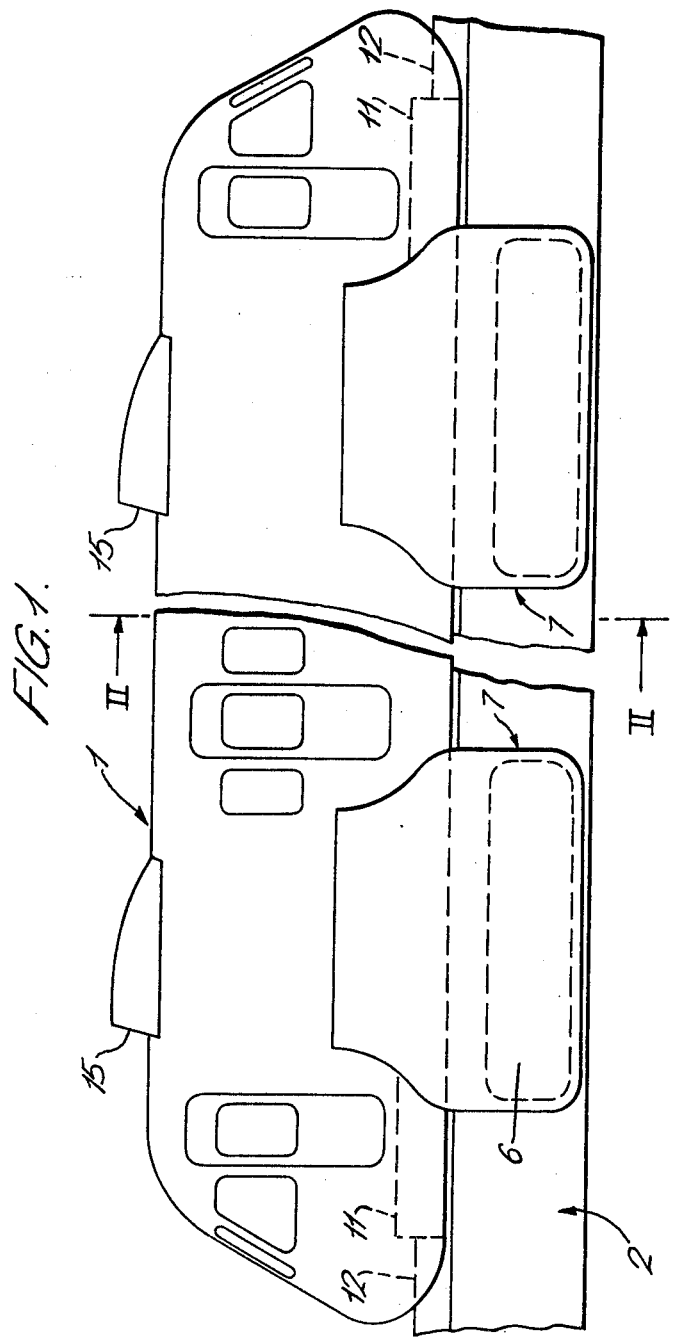

Patent No. 3,174,440 is concerned with such vehicles and in FIGURE 1 of the patent discloses a gas-cushion vehicle supported on a prepared track of substantially rectangular (vertical) cross-section. The vehicle is supported above the upper face of the track by cushions of pressurized gas ("lift" cushions) formed and contained between the vehicle body and said upper face and is guided along the track by pairs of cushions of pressurized gas ("guide" cushions) formed and contained between downwardly-depending side parts of the vehicle body which straddle the track and the side faces of the track itself.

A problem exists in providing for the vehicle to leave one track branch in order to follow another, for example, to leave one branch of a Y-like fork formed by three converging track branches to follow another branch thereof. The difficulty is caused by the track-straddling side parts of the vehicle body which, by obstruction, prevent transfer of the vehicle between track branches.

According to the invention a gas-cushion vehicle which, in operation, is supported on a prepared track, at least in part, by a gas-cushion and is guided along said track, at least in part, by a pair of oppositely-facing gas-cushions disposed between downwardly-depending side parts of the vehicle body and adjacent side faces of the track, is provided with means for lifting said side parts to positions in which they can ride over the track so that the vehicle is free to leave one track branch and follow another.

Figure 2:
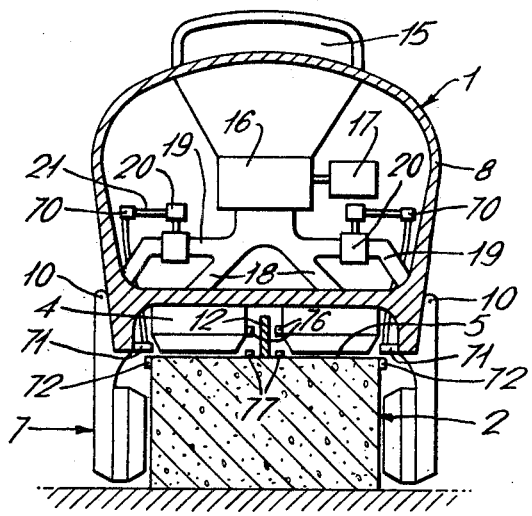
Figure 3:
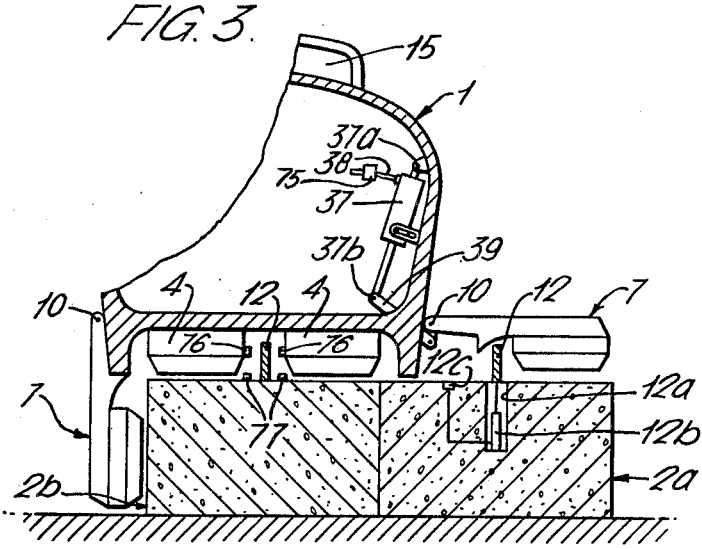
Figure 4:
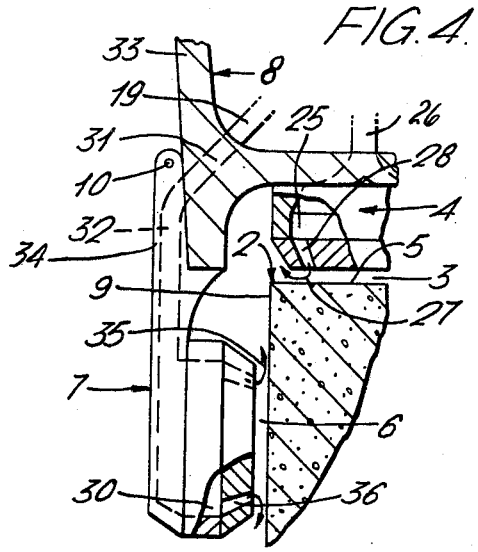
Figure 5:
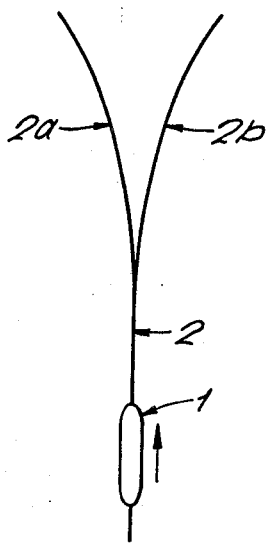
Figure 6:
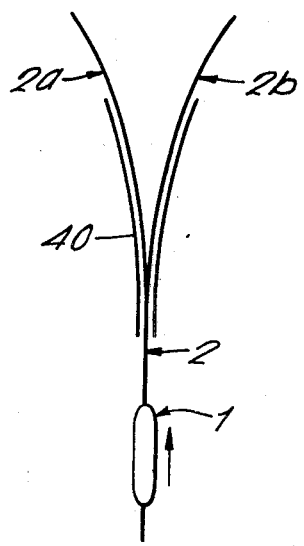
Figure 7:
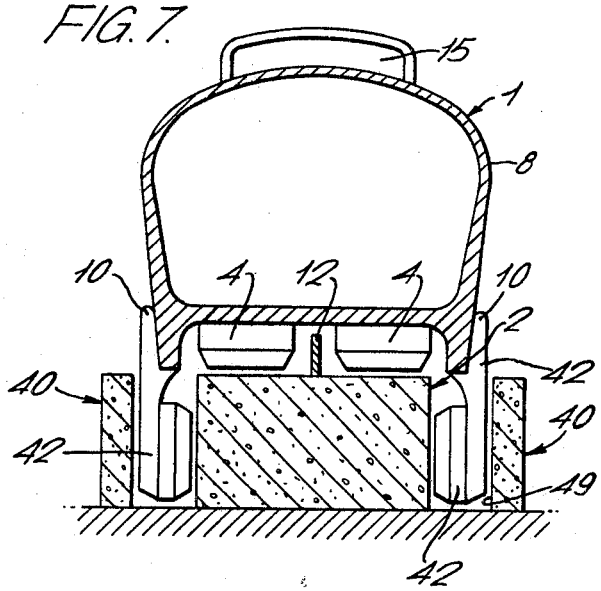
Figure 8:
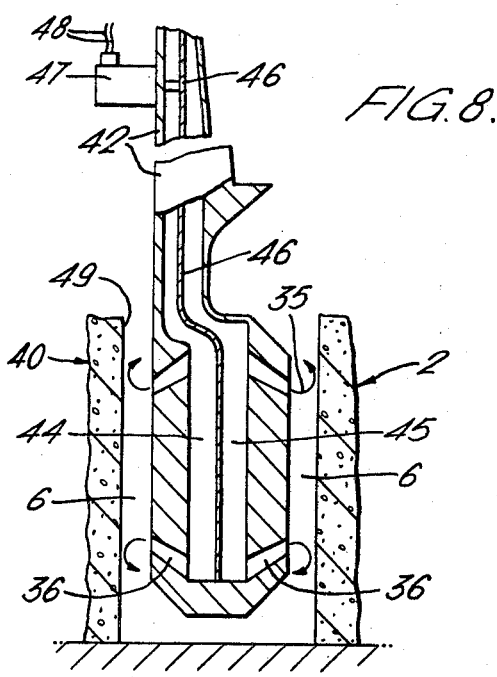
Figure 9:
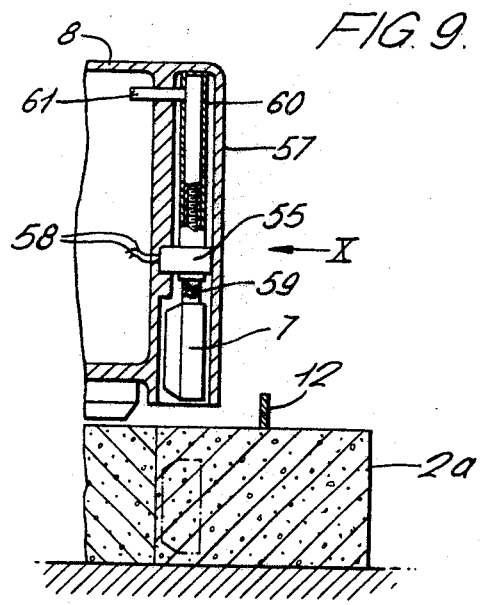
Figure 10:
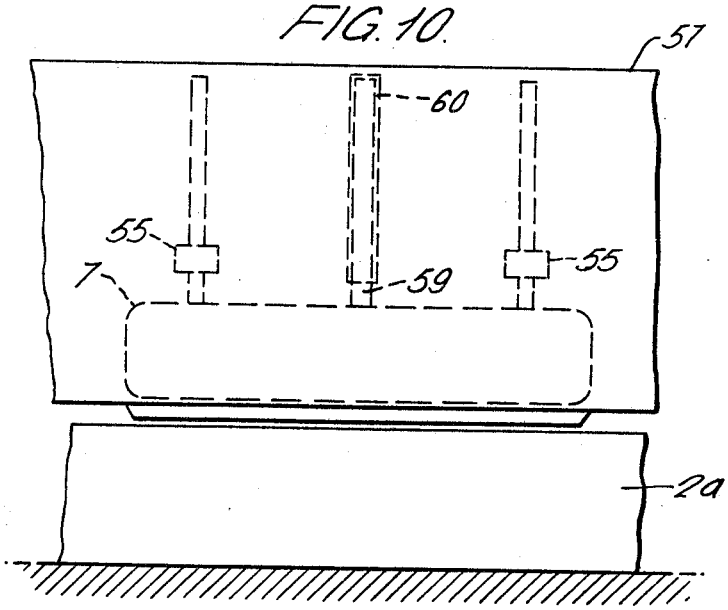

An embodiment of the invention will now be described by way of example with reference to the accompanying drawings wherein:

FIGURE 1 is a side view of a vehicle,

FIGURE 2 is a vertical section taken on the lines II—II of FIGURE 1, with added detail, FIGURE 3 is a view similar to that of FIGURE 2 but with differing detail, FIGURE 4 is an enlargement, partly in section, of part of FIGURE 2, FIGURES 5 and 6 are diagrammatic illustrations of track lay-outs, FIGURE 7 is a vertical cross-section of a modification of the vehicle of FIGURES 1 to 4, FIGURE 8 is an enlargement, partly in section, of part of FIGURE 7, FIGURE 9 is a view similar to that shown by FIGURE 3 and illustrates a modification, and FIGURE 10 is a view looking in the direction of the arrow X of FIGURE 9.

With reference to FIGURES 1, 2 and 4, a gas-cushion vehicle 1 is supported on a prepared track 2 of substantially rectangular vertical cross-section by four "lift" cushions 3 of pressurized air formed and contained between forward and rearward-disposed pairs of longitudinal pads 4 and the top surface 5 of the track 2 and guided along the track 2 by forward and rearward-disposed pairs of oppositely-facing "guide" cushions 6 also of pressurized air formed and contained between pairs of downwardly-extending side pads 7 mounted on the vehicle body 8 so as to straddle the track and adjacent side faces 9 of the track 2. The upper ends of the side pads 7 are pivotally mounted on journals 10 to the vehicle body 8 and are retractable so that they may be lifted to positions (as shown in FIGURE 3) in which they can ride over the track so that the vehicle is free to leave one track branch and follow another.

The vehicle 1 is propelled along the track 2 by a linear induction motor system wherein motor windings 11 of the "stator" structure of the motor are mounted in the bottom of the vehicle body 8 on each side of an upright linear motor rail 12 or "rotor" extending axially along the top surface 5 of the track 2. For a full description of a linear induction motor system see the publication "New Scientist" (No. 255), Oct. 5, 1961, pages 42 to 45. The article entitled "The Tracked Hovercar for Inter-City Transport," by D. S. Bliss, published in the "New Scientist," (No. 12) 1961, pages 541 to 544, is also relevant to this application.

The air for the lift and guide pads 4, 7 is drawn in through forward and rearward-disposed atmospheric air intakes 15 by compressors 16 driven by variable speed engines 17 and discharged in a pressurized condition to the pads 4 and 7 by ducts 18 and 19 respectively. Air flow through each duct 19 is automatically controlled, in an individual manner, by an electrically operated valve 20 connected to a controller 70 through electrical signal lines 21.

To avoid wastage of cushion air when a pad 7 is retracted, the controller 70 associated with that pad is operated to shut off the supply of air immediately before the pad is retracted and to restore the air supply immediately after the pad 7 is extended. This is done by means of a two-position switch device 71 mounted on the undersurface of the vehicle body so as to be responsive to magnetic field signals generated by electromagnets 72 attached to the track 2 at suitable distances each side of the track fork and in positions where they can influence the switches 71. The magnets 72 have "left-hand" and "right-hand" windings. The field generated by a "left-handed" electro-magnet 72 causes the switch 71 to cease the supply of cushion air to the pad 7 and so the magnet is positioned down-track of the track fork and the field generated by a "right-handed" magnet 72 causes the switch 71 to restore the supply of cushion air and so is positioned up-track of the track fork. The electro-magnets 72 are energized as required from an operations control station remote from the track.

As shown in the right-hand portion of FIGURE 3, the lengths of linear motor rail 12 associated with the track fork are retractable into slots 12a in the track. These rail sections are withdrawn and extended relative to the track top surface 5 by electrically-operated actuators 12b, the movements of which are controlled by switches 12c. The switches 12c are disposed on the track surface 5 and are pressure operated, being sensitive to pressures corresponding to the pressure of the vehicle-supporting cushions 3. The switches 12c are disposed uptrack and downtrack of the track fork and arranged so that one switch causes a linear motor rail section to be withdrawn into the track and another causes the rail section to be extended to its original position.

As shown in FIGURE 4, air is fed to chambers 25 formed within the lift pads 4 by way of connections 26 penetrating the bottom of the vehicle body 8 and is thereafter discharged in the form of air-curtains 27 through peripheral slots 28 formed in the bottom surfaces of the pads. The air-curtains initially form and thereafter contain the lift cushions 3 in the manner disclosed by Patent No. 3,363,716. Air is fed to chambers 30 formed within the guide pads 7 by way of co-operating connections 31, 32 penetrating the side wall 33 of the vehicle body and extensions 34 of the pads 7 respectively. Thereafter, air is discharged in the form of air-curtains 35 through peripheral slots 36 formed in the inner faces of the pads 7 to form and contain the guide cushions 6 in the manner described above in respect of lift pads 4.

As shown in FIGURE 3, each of the guide pads 7 may be retracted to a position where it is free of the track 2 (and vice versa) by a hydraulic ram 37 under the automatic control, through hydraulic signal lines 38, of a controller 75. Each controller 75 is operated by a two-position switch device 76 carried on a pad 4 so as to be responsive to magnetic fields generated by electro-magnets 77 attached to the track 2. The electro-magnets 77 have "left-hand" and "right-hand" windings and are positioned so that, say, a "left-handed" magnet 77 causes the switch 76 to operate the ram 37, through the controller 75, so as to retract a pad 7 and a "right-handed" magnet to have the opposite effect. Thus, a "left-handed" electro-magnet 77 is disposed downtrack of a track fork and a "right-handed" magnet uptrack thereof. As in the case of the electro-magnets 72, the electro-magnets 77 are energized as required from an operations control station remote from the track. The cylinder of each ram 37 is pivotally attached at 37a to the vehicle body 8 and the outer end of the ram piston is pivotally attached at 37b to a crank 39 attached to the guide pad 7 so as to be rotatable about the journal 10. To lift a guide pad 7 to the position shown in FIGURE 3, the associated ram 37 is operated to rotate the crank 39 outwardly and to move the pad 7 to the position shown in FIGURE 2, the ram 37 being operated to rotate the crank inwardly.

With reference now to FIGURE 5, the vehicle 1 is shown travelling towards a Y-like fork formed by three converging track branches, namely, the branch formed by the track 2 on which the vehicle is presently travelling and two further branches 2a and 2b, the guide pads 7 being maintained in the positions shown in FIGURE 2.

As the vehicle 1 approaches the fork formed by the three track branches and assuming the vehicle is required to leave track 2 and follow track 2b, then the rams 37 on the left-hand side of the vehicle are operated to temporarily retract the guide pads 7 clear of the track (as shown in FIGURE 3) on that side so that those pads are kept clear of the adjacent part of the track 2a and the vehicle is free to rode over the fork. Simultaneously, a pressure switch 12c on track 2 operates to withdraw sections of the linear motor rail 12 into the track 2a so as not to obstruct passage of the vehicle 1. As soon as the vehicle 1 has transferred to track 2b the rams 37 associated with the port side guide pads 7 are operated to return the pads to their original position and operation of a pressure switch 12c on track 2b causes the linear motor rail section withdrawn into track 2a to be extended to its original position. During retraction of the guide pads 7, the air supplied thereto by the associated ducts 19 is shut off by operation of the respective valve 20 as described above.

As the vehicle negotiates the fork of the tracks 2, 2a and 2b, it may be that centrifugal force is sufficient to compensate for the loss of the stabilizing side force previously provided by the guide cushions 4 on the port side of the vehicle. If, however, the speed of the vehicle is too slow for centrifugal force to have this effect, or if forces applied by side winds are likely to override centrifugal forces, then the modifications illustrated in FIGURES 6, 7 and 8 can be used with advantage.

With reference to FIGURES 6, 7 and 8, concrete walls 40 are disposed substantially parallel to but spaced from the fork of the tracks 2, 2a and 2b, and also a short distance on each side of said fork, and the vehicle 1 is now provided with downwardly-depending guide pads 42 identical to the guide pads 7 of FIGURES 1 to 4 except that the pads 42 have annular slots 36 on opposite side faces thereof. Furthermore, with particular reference now to FIGURE 8, the chamber 30 and connection 32 are divided vertically into spaces 45, 46 by a central wall 46, and an electrically operated gate-type shut-off valve 47 is provided to control air flow through the space 44. The valve 47 is under the automatic control, through electrical signal lines 48, of an electro-magnetic arrangement as described above.

With reference now to FIGURE 7, assuming the vehicle is required to transfer from track 2 to 2b (as described above in connection with FIGURE 5), then the left-hand guide pads 42 are retracted and the valves 47 associated with the right-hand guide pads are opened automatically to allow air to flow through both slots 36 on each pad 42 to form two sets of air-curtains 35 and guiding air-cushions 6, one between the pad and the track 2 (and later track 2b) and the other between the pad and the inner face 49 of the adjacent wall 40. The vehicle 1 is thus given lateral stability as it negotiates the track fork.

With reference to FIGURES 9 and 10, a guide pad 7 can be lifted and lowered vertically by a spaced pair of rotary actuators 55, the spindles 56 of which are attached to the upper edge of the pad 7. The actuators 55 are disposed within a housing 57 attached to the vehicle body 8 and are controlled, automatically, in a manner the same as that adopted for the ram 40 of FIGURE 3, through electrical signal lines 58.

In this modification, cushion air is conducted to the guide pad 7 by way of a pair of interfitting tubes 59, 60. Tube 59 is attached to the pad 7 and tube 60 to the vehicle body 8. Pressurized air is fed to the tube 60 by way of a duct 61. As the pad 7 is raised and lowered by the actuators 55, the tubes 59, 60 telescope to provide a variable-length duct between the duct 61 and pad 7.

The modification of FIGURES 9 and 10 can be used either with or without the modification of FIGURE 8.

In a modification of any of the above-described arrangements, the magnetically-operated switches 71 and/or 76 are replaced by switches sensitive to radio signals and the electro-magnets 72 and/or 77 replaced by radio-signal transmitters operated by air pressure-sensitive switches similar to the switches 12c.

In a further modification of any of the afore-mentioned arrangements, each of the pads 7 is attached to the vehicle body 8 by a parallel link mounting so that the pad is lifted and lowered in a plane substantially parallel to the fore and aft axis of the vehicle.

We claim:
1. A gas-cushion vehicle which, in operation, is supported, at least in part, on a prepared track having a plurality of branches, by a gas-cushion formed and contained between the vehicle body and an upper surface of the track and is guided along the track, at least in part, by a pair of oppositely-facing gas-cushions disposed between side surfaces of the track and structural members movably attached to and depending downwardly from the vehicle body, including means for selectively lifting said structural members and their associated gas-cushions away from said side surfaces to positions in which they can ride over the track so that the vehicle is free to leave one track branch to follow another.

2. A vehicle as claimed in claim 1 wherein the means for lifting said structural members includes automatic control means responsive to signals generated outside the vehicle body.

3. A vehicle as claimed in claim 2 wherein said automatic control means are responsive to a magnetic field.

4. A vehicle as claimed in claim 2 wherein said automatic control means are responsive to a radio signal.

5. A vehicle as claimed in claim 2 wherein said automatic control means are responsive to a radio signal transmitted by transmitter means controlled by pressure-sensitive switch means disposed on the vehicle track so as to be operable by contact with the vehicle-supporting gas cushion.

6. The combination of a vehicle as claimed in claim 1 and a prepared track for support and guidance of the vehicle.

7. The combination of claim 6 wherein said track includes a track portion converging with two other track portions to form a "Y"-like fork, wall means spaced laterally from and disposed substantially parallel to said fork, and means carried by at least one of said structural members attached to the vehicle body for forming a cushion of pressurized gas between the side of the structural member remote from the track and an adjacent side surface of the wall means.

8. The combination of claim 6 wherein the vehicle is propelled by linear motor means comprising a stator structure carried by the vehicle and a linear motor rail carried by the track.

9. The combination of claim 8 wherein means are provided for retracting at least a section of the linear motor rail towards the track hereby it is free of contact with the vehicle.

10. The combination of claim 7 wherein the gas-cushion of said last-mentioned means is supplied with gas from gas supply means controlled by means responsive to signals generated outside the vehicle body.

11. The combination of claim 7 wherein the gas cushion of said last-mentioned means is supplied with gas from gas supply means controlled by magnetically operated means sensitive to and operated by a magnetic field generated by magnetic means attached to the track.

References Cited

UNITED STATES PATENTS

| 2,969,751 | 1/1961 | Toulmin | 104—292 |
| 3,330,384 | 7/1967 | Bertin | 104—23 |
| 3,340,822 | 7/1967 | Delasalle | 104—130 |
| 3,385,228 | 5/1968 | Chung | 104—148 |

ARTHUR L. LA POINT, Primary Examiner

ROBERT SAIFER, Assistant Examiner

U.S. Cl. X.R.

104—148, 130